(12) United States Patent
Ivanov et al.

(10) Patent No.: US 8,101,913 B2
(45) Date of Patent: Jan. 24, 2012

(54) METHOD OF MAKING LARGE AREA CONFORMABLE SHAPE STRUCTURES FOR DETECTOR/SENSOR APPLICATIONS USING GLASS DRAWING TECHNIQUE AND POSTPROCESSING

(75) Inventors: Ilia N. Ivanov, Knoxville, TN (US); John T. Simpson, Clinton, IN (US)

(73) Assignee: UT-Battelle, LLC, Oak Ridge, TN (US)

( * ) Notice: Subject to any disclaimer, the term of this patent is extended or adjusted under 35 U.S.C. 154(b) by 137 days.

(21) Appl. No.: 12/558,101

(22) Filed: Sep. 11, 2009

(65) Prior Publication Data

US 2011/0061478 A1 Mar. 17, 2011

(51) Int. Cl.
*G01J 1/00* (2006.01)
(52) U.S. Cl. .......................... 250/336.1; 73/866; 65/402
(58) Field of Classification Search .................. 73/866; 65/402; 250/336.1
See application file for complete search history.

(56) References Cited

U.S. PATENT DOCUMENTS

| | | | |
|---|---|---|---|
| 3,953,131 A * | 4/1976 | Britz | ............................ 356/141.1 |
| 5,110,334 A | 5/1992 | Ayers | .................................. 65/2 |
| 5,400,136 A | 3/1995 | Vo-Dinh | |
| 6,532,326 B1 | 3/2003 | Hutchinson et al. | |
| 6,552,842 B2 | 4/2003 | Simpson et al. | |
| 6,661,952 B2 | 12/2003 | Simpson et al. | |
| 6,757,463 B2 | 6/2004 | Hutchinson et al. | |
| 6,853,669 B2 | 2/2005 | Simpson et al. | |
| 7,139,072 B1 | 11/2006 | Boss et al. | |
| 7,150,904 B2 | 12/2006 | D'Urso et al. | |
| 7,258,731 B2 | 8/2007 | D'Urso et al. | |
| 7,267,948 B2 | 9/2007 | Vo-Dinh | |
| 7,312,088 B2 | 12/2007 | Farquharson | |
| 7,312,875 B2 | 12/2007 | Hanson et al. | |
| 7,351,588 B2 | 4/2008 | Poponin | |
| 7,767,564 B2 | 8/2010 | Dutta | ............................ 438/585 |
| 2002/0121856 A1 | 9/2002 | Tsai | |
| 2005/0109918 A1 | 5/2005 | Nikzad et al. | |
| 2005/0196775 A1 | 9/2005 | Swager et al. | ..................... 435/6 |
| 2005/0264157 A1 | 12/2005 | Sakai et al. | |
| 2005/0268962 A1 * | 12/2005 | Gaudiana et al. | ............. 136/255 |
| 2006/0023451 A1 | 2/2006 | Han et al. | ....................... 362/249 |
| 2006/0034729 A1 | 2/2006 | Poponin | |
| 2006/0252065 A1 | 11/2006 | Zhao et al. | |
| 2006/0279191 A1 | 12/2006 | Geohegan et al. | |
| 2006/0289380 A1 | 12/2006 | D'Urso et al. | |

(Continued)

OTHER PUBLICATIONS

Xuejun Zhang et al., "Mass-Productions of vertically Aligned Extremely Long Metallic Micro/Nanowires Using Fiber Drawing Nanomanufacturing", Advanced Materials, 2008, pp. 105.

(Continued)

*Primary Examiner* — David Porta
*Assistant Examiner* — Hugh H Maupin
(74) *Attorney, Agent, or Firm* — Brinks Hofer Gilson & Lione

(57) ABSTRACT

A method of making a large area conformable shape structure comprises drawing a plurality of tubes to form a plurality of drawn tubes, and cutting the plurality of drawn tubes into cut drawn tubes of a predetermined shape. The cut drawn tubes have a first end and a second end along the longitudinal direction of the cut drawn tubes. The method further comprises conforming the first end of the cut drawn tubes into a predetermined curve to form the large area conformable shape structure, wherein the cut drawn tubes contain a material.

9 Claims, 7 Drawing Sheets

U.S. PATENT DOCUMENTS

| | | | |
|---|---|---|---|
| 2007/0048249 | A1 | 3/2007 | Youngblood et al. |
| 2007/0131266 | A1 | 6/2007 | Dutta |
| 2007/0155021 | A1 | 7/2007 | Zhang et al. |
| 2007/0164270 | A1* | 7/2007 | Majumdar et al. ............ 257/14 |
| 2008/0026188 | A1 | 1/2008 | D'Urso et al. |
| 2008/0061689 | A1 | 3/2008 | Ohkubo et al. |
| 2008/0080816 | A1 | 4/2008 | D'Urso et al. |
| 2008/0144026 | A1 | 6/2008 | Zhao et al. |
| 2008/0160865 | A1 | 7/2008 | Wei et al. |
| 2008/0169016 | A1 | 7/2008 | Dutta ............................ 136/238 |
| 2008/0191606 | A1 | 8/2008 | Geohegan et al. |
| 2008/0198376 | A1 | 8/2008 | Poponin |
| 2008/0296252 | A1 | 12/2008 | D'Urso et al. |
| 2009/0042469 | A1 | 2/2009 | Simpson |

OTHER PUBLICATIONS

Andris V. Bune et al., "*Materials Research in Low Gravity*", SPIE—The International Society for Optical Engineering, vol. 3123, 1997, 12 pgs.

Zhihua Xu et al., "*Carbon nanotube effects on electroluminescence and photovoltaic response in conjugated polymers*", Applied Physics Letters 87, 263118 (2005), 3pgs.

Yu. A. Goldberg, "*Handbook Series on Semiconductor Parameters*", vol. 1, M. Levinshtein, S. Rumyantsev and M. Shur, ed, World Scientific, London, 1996, pp. 191-213.

Yue Wang et al. "*Growth and properties of 40 mm diameter Hg1-xCdxTe using the two-stage Pressurized Bridgman Method*", Journal of Crystal Growth, vol. 273, Issues 1-2, Dec. 17, 2004, pp. 54-62.

Yue Wang et al., "*A two-stage technique for single crystal growth of HgCdTe using a pressurized Bridgman method*", Journal of Crystal Growth, vol. 263, Issues 1-4, Mar. 1, 2004, pp. 273-282.

A. Rogalski, "*HgCdTe infrared detector material: history, status and outlook*", Institute of Physics Publishing, Reports on Progress in Physics, vol. 68, 2005, pp. 2267-2336.

D. F. Gibbons, "*Thermal Expansion of Some Crystals with the Diamond Structure*", Physical Review, vol. 112, No. 1,, Oct. 1, 1958, pp. 136-140.

\* cited by examiner

METHOD OF MAKING LARGE AREA CONFORMABLE SHAPE STRUCTURES FOR DETECTOR/SENSOR APPLICATIONS USING GLASS DRAWING TECHNIQUE AND POSTPROCESSING This invention was made with government support awarded by the U.S. Department of Energy (Prime Contract No. DE-AC05-00OR22725). The government has certain rights in the invention.

The present disclosure is related to U.S. patent application Ser. No. 12/558,129 to Ivanov et al., filed on the same date as this disclosure, entitled "Method For Morphological Control And Encapsulation Of Materials For Electronics And Energy Applications" and commonly owned by the assignee of the present disclosure, the entirety of which is hereby incorporated by reference. The present disclosure is also related to U.S. patent application Ser. No. 12/558,145 to Ivanov et al., filed on the same date as this disclosure, entitled "Design Of Large Area Substrate For Surface Enhanced Raman Spectroscopy (SERS) Using Glass-Drawing Technique" and commonly owned by the assignee of the present disclosure, the entirety of which is hereby incorporated by reference.

TECHNICAL FIELD

The present disclosure relates to a method of making large area conformable shape structures for detector/sensor applications using a glass drawing technique and postprocessing.

BACKGROUND

A focal plane array is an array of light-sensing pixels at the focal plane of a lens. Focal plane arrays are commonly used for both imaging and non-imaging purposes, such as spectrometry, and civil and military sensing. Focal plane arrays operate by detecting photons at particular wavelengths and then generating an electrical charge, voltage, or resistance in relation to the number of photons detected at each pixel. This charge, voltage, or resistance is then measured, digitized, and used to construct an image of the object, scene, or phenomenon that emitted the photons.

Typically, focal plane arrays are two-dimensional devices that are sensitive in the infrared spectrum. Focal plane arrays can operate at other spectra, such as the visible spectrum. Examples of focal plane arrays sensitive in the visible spectrum include CCDs and CMOS image sensors.

As the size of devices using focal plane arrays decreases, focal plane arrays become smaller and more complex. A solution to reduce focal plane array complexity is to use curved focal plane arrays as opposed to planar focal plane arrays. One advantage of a curved focal plane array is its field curvature. Curved focal plane arrays previously reported have a radius of curvature $\geq 5$ meters.

BRIEF SUMMARY

In one aspect, a method of making a large area conformable shape structure comprises drawing a plurality of tubes to form a plurality of drawn tubes, and cutting the plurality of drawn tubes into cut drawn tubes of a predetermined shape. The cut drawn tubes have a first end and a second end along the longitudinal direction of the cut drawn tubes. The method further comprises conforming the first end of the cut drawn tubes into a predetermined curve to form the large area conformable shape structure, wherein the cut drawn tubes contain a material. In another aspect, a large area curved shape structure comprises a plurality of bundled tubes having a first end and a second end along the longitudinal direction of the bundled tubes. A detector material is disposed inside of the bundled tubes. The detector material is substantially continuous between the first end and the second end. The first end is a curved surface with a radius of curvature, relative to the longitudinal direction of the plurality of bundled tubes, of no more than about 1 cm. Electrical circuitry is disposed on the second end.

In yet another aspect, a large area curved shape structure comprises a plurality of bundled tubes having a first end and a second end along the longitudinal direction of the bundled tubes. A detector material is disposed inside of the bundled tubes. The detector material is substantially continuous between the first end and the second end. The first end is a curved surface with a field view, relative to the longitudinal direction of the plurality of bundled tubes, of about 90 degree. Electrical circuitry is disposed on the second end.

DETAILED DESCRIPTION OF THE PREFERRED EMBODIMENTS

The present disclosure is directed to a method of making large area conformable shape structures for detector/sensor applications using a glass drawing technique and postprocessing. It is provided a method of making hemispherical curved focal plane array detectors, which can be used for imaging in the VIS-NIR-SWIR (about 400-1900 nm) spectral region. It is also provided a conformable focal plane array for integrating on a hemispherical surface, suitable for high-performance imagers with a small form factor and with a wide field of view. The present disclosure is also directed to detectors using the novel conformable curved focal plane arrays.

Large Area Conformable Shape Structures

Figure 1A:
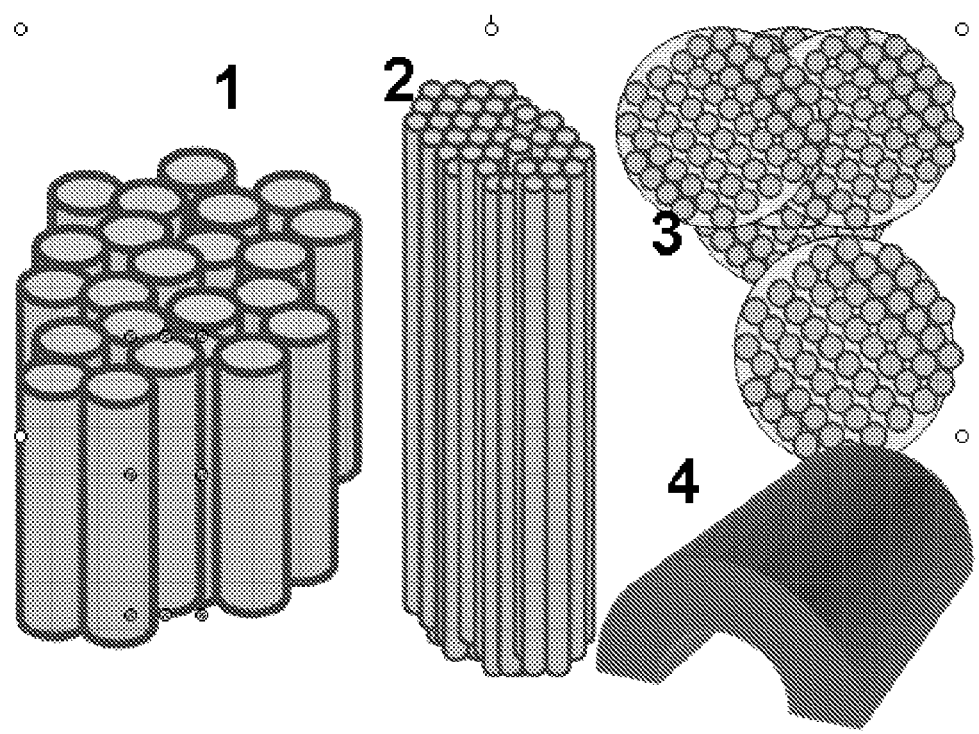
FIG. 1 is a not-to-scale schematic view of the method of making large area conformable detectors.
Figure 1B:
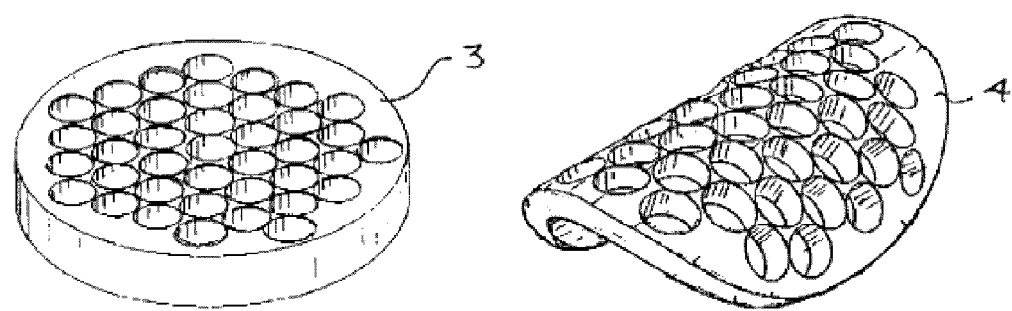
Figure 1C:
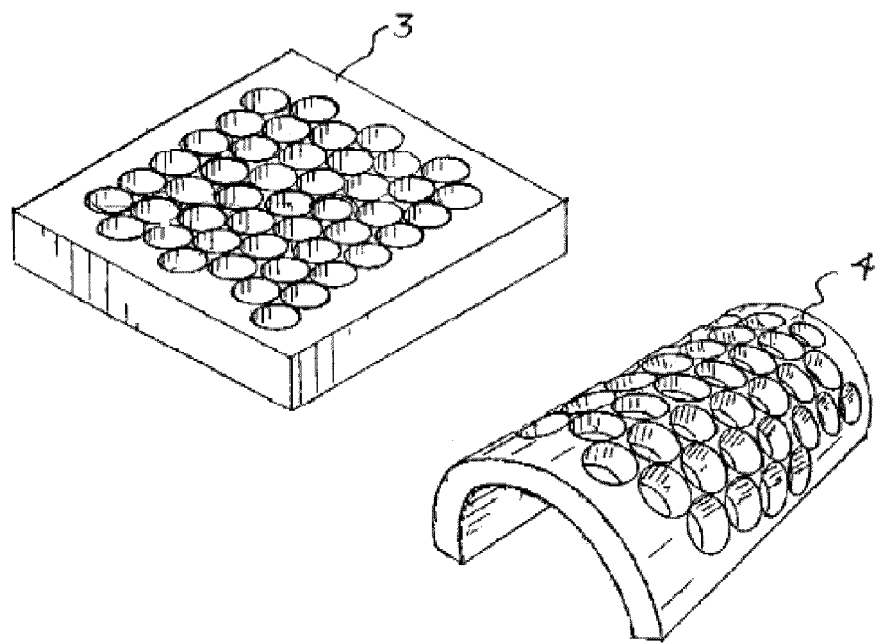

According to one embodiment of the present disclosure, a method is provided for making and shaping a large area conformable shape structure for detectors based on a combination of a glass drawing technique and thermal post processing of assemblies obtained from the glass drawing process. Referring to FIG. 1A-1C, a bundle of tubes 1 is formed from a plurality of single dielectric tubes, such as glass tubes. The bundle of glass tubes 1 is drawn, and redrawn if needed, to form a plurality of drawn glass nanotubes 2. The drawn glass nanotubes 2 are cut and shaped to form a conformable shape structure (conformable curved focal plane arrays) 4. The cut drawn glass nanotubes can have any shape, such as plates, tiles, or disks. In one example, the drawn glass nanotubes 2 are cut into disks 3. Herein, the terms "conformable shape structures" and "conformable curved focal plane arrays" are used interchangeably. The bundling, drawing, cutting, and shaping processes will be described in detail below.

Any suitable dielectric tubes can be used to prepare the conformable shape structure 4. For example, the dielectric tubes can be hollow glass tubes, or composite glass rods comprising a matrix material of the rods and a core disposed inside of the matrix material. The core comprises a detector material. The drawn glass nanotubes 2 can assume any shape, such as a circle, a square, a rectangle, an oval, a triangle, a hexagonal shape, or an irregular shape. The cut drawn glass nanotubes can assume any shape in the transverse direction of the nanotubes, such as a circle, a square, a rectangle, an oval, a triangle, a hexagonal shape, or an irregular shape. The cut drawn glass nanotubes can assume any shape in the longitudinal direction of the nanotubes. Preferably, the cut drawn glass nanotubes have a disk shape in the longitudinal direction. The thickness of the cut drawn glass nanotubes in the longitudinal direction varies. In one example, the thickness is about 0.1-10 mm.

The drawn glass nanotubes 2 function as dielectric-detector composites. The nanotubes electrically isolate individual detector material, which is disposed inside of the drawn nanotubes. Each of the drawn glass nanotubes 2 with the isolated individual detector material forms a fiber for the detector. Each fiber acts as a single imaging device (pixel). The size of the imaging device is defined by the number of pixels. The size of the individual pixel is determined by the drawing ratio, and can be reduced down to submicron size (e.g., less than about 1 micron). Preferably, the size of the pixels is in the nanometer range (e.g. less than about 100 nm).

Electrical contacts (circuitry) are disposed at the individual pixels at the respective ends distal to the field. The electrical contacts can be attached to the individual pixels before or after the shape-conforming procedure. The detector material can be placed inside the insulating tubes before or after the drawing/shape-conforming procedure via any suitable method, such as infiltration, back-filling or synthesis. For example, the detector material is placed inside the insulating tubes after the drawing/shape-conforming procedure by back infiltration/filling. In one example, infiltration involves passing a suspension of a detector material through the tubes, and then allowing the solvent in the suspension to evaporate and the detector material to deposit on the walls of the tubes. In another example, a chemical reaction carried inside the tubes could be used to generate a sensory material. In yet another example, back filling occurs when part of the tube is filled with a metal wire (electrode enabling electrical contact to a detector material) and then a detector material is deposited via electrochemical deposition (or other technique). After deposition of a transparent conductive top electrode (for example, indium tin oxide or a nanotube network), a multipixel detector can be activated.

The shape structures according to one embodiment of the present disclosure are conformable. The nanotubes are drawn and shaped to be curved to various curvatures. Any suitable shaping method can be used. In one example, the nanotubes are shaped by heating and negative shape model. In one example, a nanotube suspension is sprayed on the surface of the nanotubes, and after solvent evaporation, the nanotubes conform to the surface. In another example, negative shape model provides a surface structure to which a detector can be conformed. For example, a slice of a multi-fiber (multi-pixel) is heated up to a softening temperature of the glass. Then a preheated slice of multi-fiber assembly is pressed against a negative form and allowed to cool. After cooling, the shape of the detector is fixed. In yet another example, the conformable nanotubes are conformed into a curved shape either by attaching the conformable nanotubes to a rigid, curved substrate or by applying a force through air pressure, a balloon, vacuum, or piezoelectric tranducer (PZT) to conform the conformable nanotubes to a specific curvature.

In one embodiment, the conformable shape structures are curved with a radius of curvature of about 1 cm or less. The curved shape structures can have millions of pixels and a field view of about 90 degree or more. Preferably, the conformable curved shape structures have a radius of curvature of about 1 mm or less. Preferably, the field view is about 120 degree or more. More preferably, the field of view is about 180 degree or more. In one example, a conformable shape structure is conformed to and integrated on a hemispherical surface with a field of view of more than about 180 degree. In another example, the field of view is about 270 degree. In yet another example, the field of view is about 360 degree.

Figure 2:
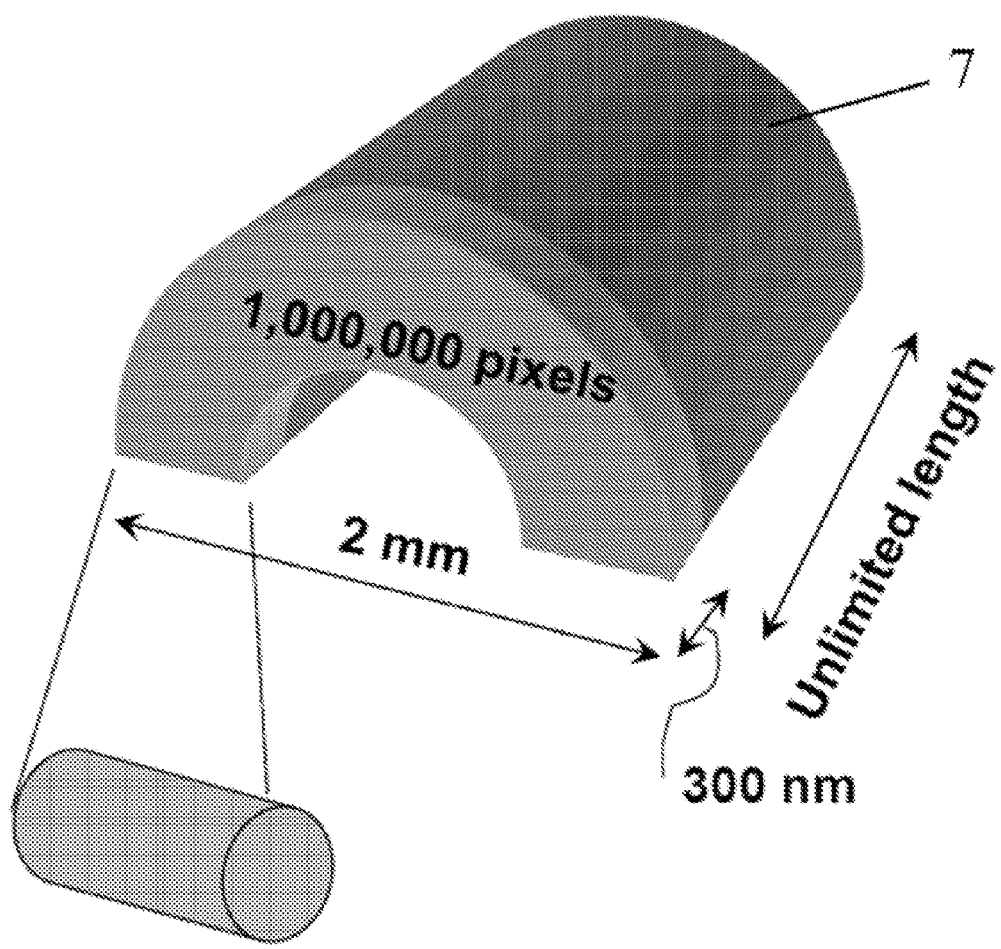
FIG. 2 is a not-to-scale schematic view of a conformable shape structure for detectors with a curvature of about 1 mm and a field view of about 180 degree.

Referring to FIG. 2, it is shown one design of a conformable shape structure for imaging. The design is capable of a resolution of about 1,000,000 pixels×infinite size for a cylindrical shape, a field view of about 180 degree, and a curvature of about 1 mm. The size of a single pixel is defined by the outer diameter of a nanotube. In one example, the size of the pixel is about 300 nm. The active area of the single pixel is defined by the inner diameter of the nanotube. In one example, the active area of the single pixel is about 100 nm. The wall thickness of the nanotube is about 100 nm. The conformable shape structure 7, shown in dark shade, has about 1,000,000 pixel resolution in the transverse direction and virtually unlimited pixel-resolution in the longitudinal direction of the cylindrical shape.

The conformable curved shape structure can be connected, via the electrical contacts at the individual pixels, to the remaining parts of a detector system for spatially resolved detection of light (visible and UV as well as infrared) and low energy particles. Detection spectrum of the detector is determined by the detector material used.

Any suitable material can be used for the individual detector material. The material of the detector can be inorganic or organic, crystalline or amorphous. In one example, the inorganic materials can be amorphous inorganic materials that can be deposited and patterned on a hemispherical surface, or alternately, inorganic structures prepared on a planar substrate and then transferred to a non-planar surface. The organic material can be of a composite material to enable desired sensitivity in particular frequency range. Examples of inorganic detector material which could be drawn include, but are not limited to, Si (detection in about 180 nm to about 1100 nm), indium antimonide (InSb, detection in about 10,000 to 2,000 $cm^{-1}$ range), mercury-cadmium-telluride (HgCdTe), indium gallium arsenide (InGaAs), and vanadium oxide ($VO_x$). A variety of lead salts can also be used. One example is PbSe.

Preferably, the thermal properties of the inorganic detector material match the softening point of the dielectric material in the nanotubes (such as glass). The detector material can then be drawn and shaped along with the dielectric material or back-infiltrated with or without vacuum aid afterwards. For example, the thermal properties of InSb shown in Table 1 below indicate that the material melts at about 527° C., which is close to the softening temperature of some glasses. Thus, the InSb material can be co-drawn with glass. The data in Table 1 are adapted from Goldbery Yu. A., *Handbook Series on Semiconductor Parameters*, M. Levinshtein, S. Rumyantsev and M. Shur, ed., World Scientific, London, 1996, the entirety of which is hereby incorporated by reference. Also, in order to select the appropriate glass material, the glass thermal expansion coefficient (TEC) needs to be considered such that during the cooling step, stresses will not develop at the interface of glass and the InSb material.

TABLE 1

| Thermal Properties Of InSb | |
|---|---|
| Bulk modulus | $4.7 \times 10^{11}$ dyn cm$^{-1}$ |
| Melting point | 527° C. |
| Specific heat | 0.2 J g$^{-1}$ ° C.$^{-1}$ |
| Thermal conductivity | 0.18 W cm$^{-1}$ ° C.$^{-1}$ |
| Thermal diffusivity | 0.16 cm$^2$ s$^{-1}$ |
| Thermal expansion, linear | $5.37 \times 10^{-6}$ ° C.$^{-1}$ |

Any suitable method can be used to deposit the detector material inside the drawn nanotubes (pixels). For example, when an inorganic material, such as InSb, is used as the detector material, the detector material can be deposited by any suitable growth methods for InSb, such as solidifying a melt from the liquid state, epitaxially by liquid phase epitaxy, hot wall epitaxy or molecular beam epitaxy, or from the organometallic compounds by MOVPE (metal organic vapor phase epitaxy).

The large area conformable shape structures according to embodiments of the present disclosure may be compact and inexpensive. The processing methods are easily scalable to enable light-weight detection systems. The focal plane arrays can be incorporated on a hemispherical surface for high-performance imaging systems with a small form factor and wide field of view. Such systems are expected to surpass the performance of planar focal imaging arrays. The flexibility of the method enables conformable shape structures of various curvatures, as small as or smaller than about 1 cm, to be produced. The number of pixels is controlled by the tube diameter, which can be in the nanometer size. The detectors may have a field of view greater than 90°.

Novel detectors according to embodiments of the present disclosure may allow the use of fewer optical elements and eliminate the need for image post processing since the hemispherical planar array can inherently correct for spherical, field curvature, and other optical aberrations. The detectors perform over a wide 400-1900 nm spectral band on curved surfaces. The detectors have a field of view of greater than 90°, which allows for a simple optical design, and thus may reduce the weight of the overall system. The improved functionality can be beneficial to a variety of applications, such as many military applications, by reducing or eliminating the need for multiple detectors or gimbals, and thus lessening the mechanical and optical complexity of the system normally required to achieve a wide field of view.

The improved functionality is very beneficial to various civil and military applications which may benefit from decreased complexity of mechanical and optical detection and access to a wide field of view.

Glass Drawing Techniques

The nanotubes can be prepared by any suitable method, for example, by etching, chemical or physical vapor deposition, laser vaporization, electrical field manipulation, hydrodynamic flow, lithographic techniques, synthetic methods, and glass drawing techniques. Preferably, the nanotubes are prepared by glass drawing techniques.

Figure 3:
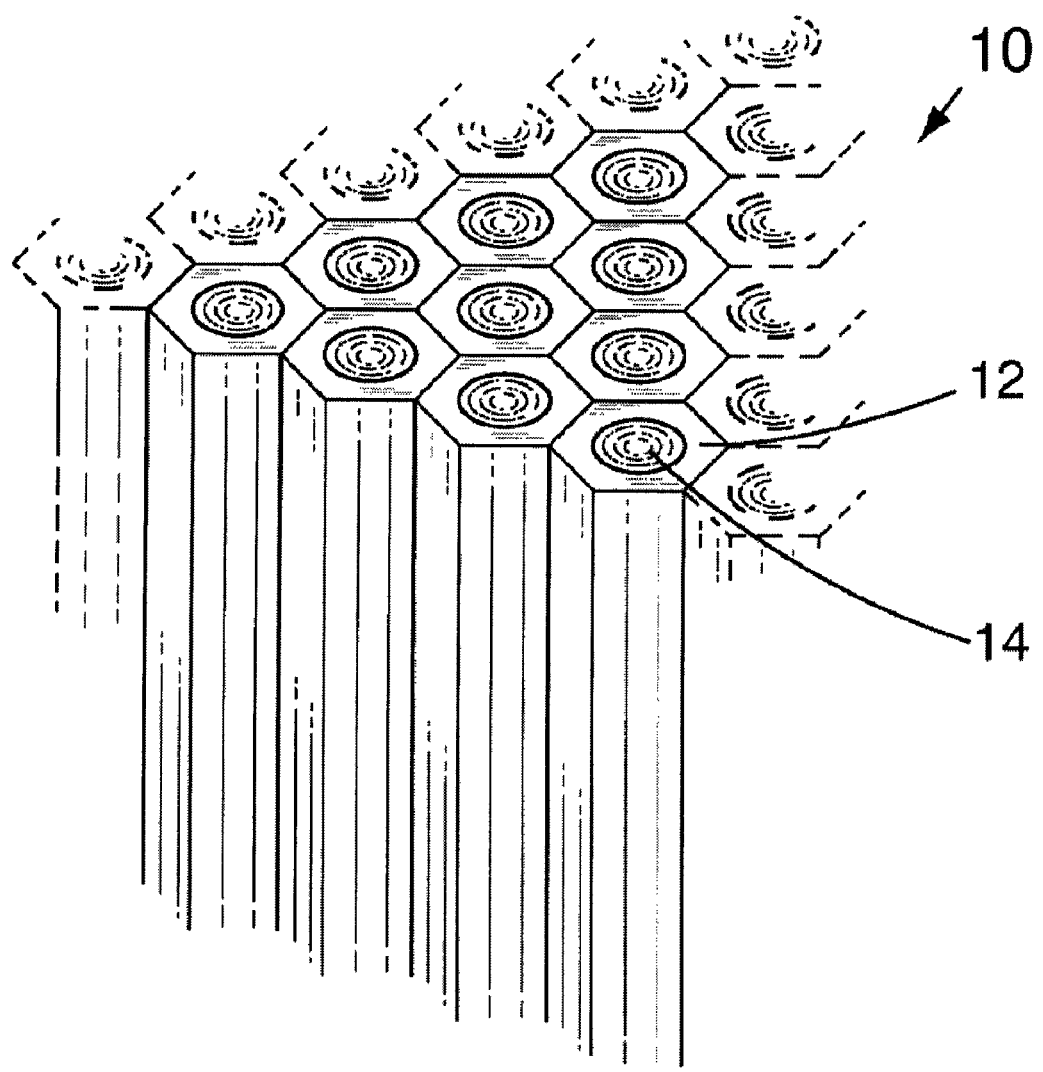
FIG. 3 is a schematic oblique view of a portion of a bundle of composite rods.

In one embodiment, composite glass rods are drawn. Referring to FIG. 3, composite rods comprise a core 14 and a sleeve (the matrix material of the rods) 12. The core 14 comprises a different material than the matrix material 12. The composite rods are bundled in an aligned array, or bundle 10. The rod (matrix material) 12 and the core 14 can assume any shape. Preferably, the rod (matrix material) 12 has a hexagonal or other outer cross-sectional shape to minimize voids while the core 14 preferably has a circular cross-section, although neither of these parameters is considered to be critical. It may be advantageous for economical manufacturing for the matrix material 12 to have a circular cross-section. In this case the voids are filled in during subsequent processing. With round rods 12, the spacing of the core 14 will be somewhat less precise.

The matrix material 12 and core 14 are preferably selected based on differential etchability (susceptibility to etching or dissolution). In the case of the nano-channel glass drawing, the core glass has a much higher etchability than that of the matrix glass. Alternatively, if the core 14 has a lower etchability than the matrix material 12, protrusive, sharp features, such as nanocones and nanospikes, may form upon etching of the composite surface if the etch contrast is low. If the etch contrast is high, the protrusive features will be cylindrical.

It should be noted that the use of immiscible components in the composite may improve the ease of drawing the material. In general it may be advantageous to choose materials with specific miscibility to facilitate drawing without too much inter-diffusion of the materials (excessively miscible) and without either component breaking up into droplets (insufficiently miscible).

The bundle 10 can heated to a temperature sufficient to soften the materials comprising the bundle 10, but low enough to avoid damage, decomposition, or other deleterious changes. The bundle 10 is then drawn, under vacuum, along the axis of the bundled rods to fuse and reduce the diameter of the bundle 10. The drawn bundle has reduced size material rod matrix material 12 and respective core 14. The drawn bundle is cut transversely into sections which can be re-bundled to increase the number of core material cores in the cross-section thereof.

The drawn bundle can then be cut into segments, re-bundled, and drawn again. The twice-drawn bundle has further reduced size material rod matrix material 12 and respective core 14. The twice-drawn bundle is again cut transversely into sections which are re-bundled to further increase the number of core 14 cores in the cross-section thereof.

The process of bundling, drawing, and cutting can be performed a single time or repeated many times until the desired diameter and spacing of the core 14 are obtained. Core 14 diameters and spacing on the nanometer scale are possible. The sizes of bundles and the number of rods contained therein can be varied throughout the process as desired.

Figure 4:
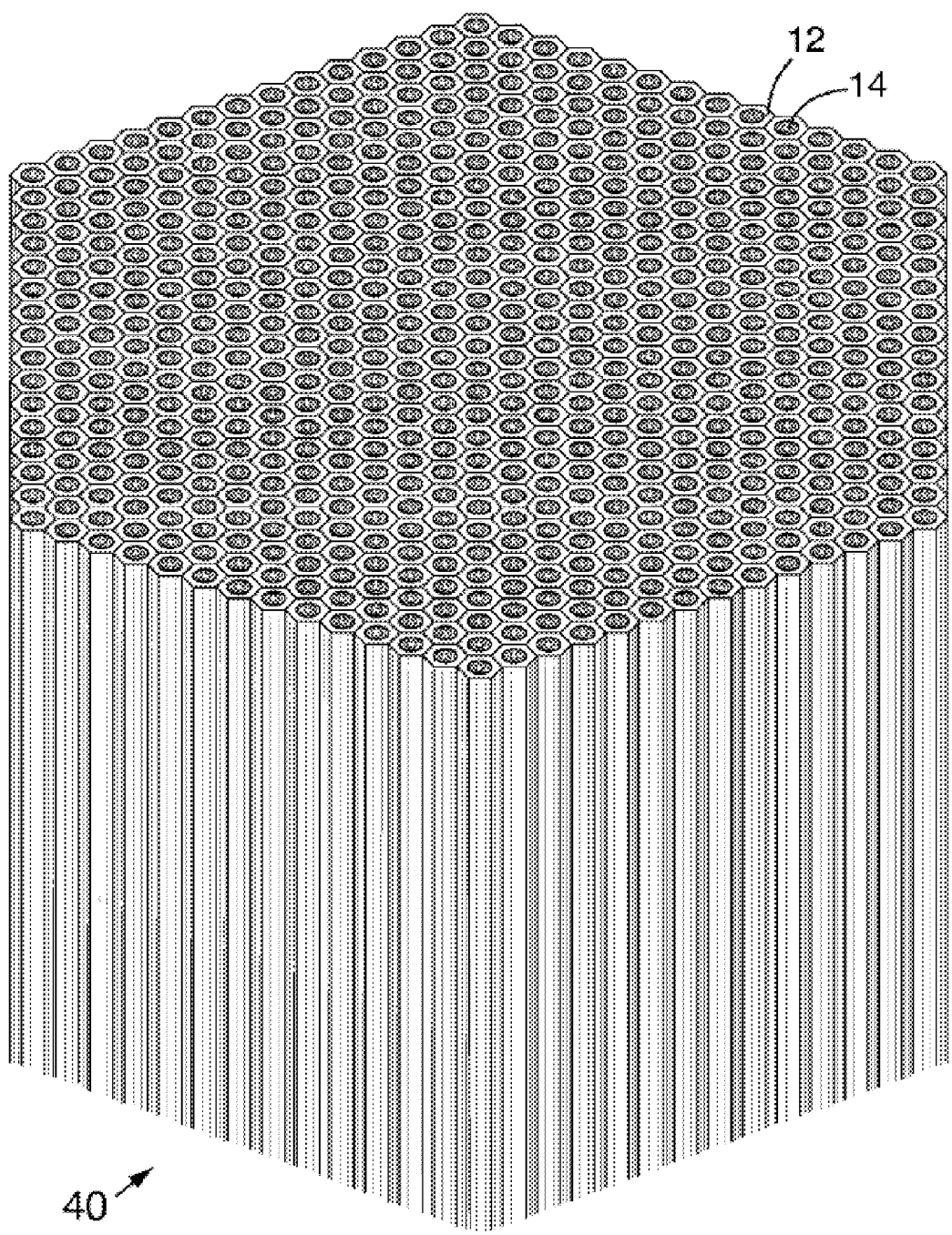
FIG. 4 is a schematic oblique view of the bundle of composite rods shown in FIG. 3 after re-bundling and fusing.

After the final draw (which can be the first draw), the bundle can be cut, bundled, and fused in order to obtain a larger diameter boule. Referring to FIG. 4, the boule 40 can be transversely cut to produce slices (plates, tiles) of any desired thickness. The cut is usually (but not necessarily) perpendicular to the original rods 12 and the drawing direction. One or both cut faces may be polished. Although a hexagonal boule 40 is shown and described as an example, a boule of any desired geometric shape can be formed, processed, and used.

In another embodiment, the composite material may comprise a bundle of more than one kind of composite rod, as described in U.S. Patent Publication No. 2006/0289380, the entirety of which is hereby incorporated by reference. For example, some of the cores may have a different core phase having a high etchability/solubility (e.g., nano-channel-like cores) so that a perforated product may be fabricated.

In yet another embodiment, solid glass rods or hollow glass tubes are used as opposed to composite glass rods. The process of bundling, drawing, and cutting is otherwise performed as described above.

In further another embodiment, glass tubes that contain appropriate filling materials in powder or rod form are drawn. The drawing method according to the embodiment combines fiber drawing method with advanced filling materials, thus providing not only desired functionality, but also excellent controls over the aspect ratio, diameter, length and inter-nanotube spacing of micro/nanotubes.

A preform for drawing may be prepared by pouring powders or inserting a rod into a glass tube. Drawn tubes from the first drawing process are cut into pieces, preferably with substantially equal length, which are bundled together to form a hexagonal bundle for the next drawing cycle. By repeating the drawing-cutting-bundling process for as many, or as few, times as needed, the outer and the inner diameters, and the thickness of the glass tubes may be decreased from centimeters to hundreds nanometers or less.

After the last drawing, the drawn nanotubes are bundled and annealed below the softening temperature of the glass to make a solid rod. In one example, the rod is cut perpendicular to its axis to make plates that have ordered array of micro/nanotubes of the filling materials. If needed, after making encapsulated nanotubes, the glass can be removed by etching, such as hydrogen fluoride etching. The nanotubes prepared can have a nanometer size diameter, and a length of several meters or longer. Preferably, a vacuum pump is connected to the glass tube, and the drawing is done in vacuum to avoid the possible oxidation of the filling materials and to make an intimate contact between the glass and the filling materials.

Any suitable material can be used as the filling material in the preform. Preferably, the softening temperature of the glass is between the melting temperature and the boiling temperatures of the filling material. Preferably, the coefficients of thermal expansion of the glass and the filling material at the drawing temperature are close to each other, or the filling material is in liquid. Preferably, there is substantially no chemical reaction between the glass and the material at the drawing temperature. Preferably, the molten material has certain wettability to the glass surface. Preferably, the materials do not have high vapor pressure at high temperature.

The drawn nanotubes can be etched and/or coated using any suitable methods. For example, the drawn nanotubes can be etched and coated as described in U.S. Patent Publication No. 2006/0289380, the entirety of which is hereby incorporated by reference.

Structured Nanomaterial

The glass drawing technique can be used to prepare structured nanomaterials. The structured material can assume various periodicities and shapes. For example, the structured nanomaterial can be comprised of nanotubes with protrusive features such as spikes and cones, hollow nanotubes, or filled nanotubes. The structured nanomaterial can be superhydophobic or superhydrophilic. The periodicity of the structured nanomaterial can be determined by the periodicity of the bundled tubes before drawing.

Figure 5:
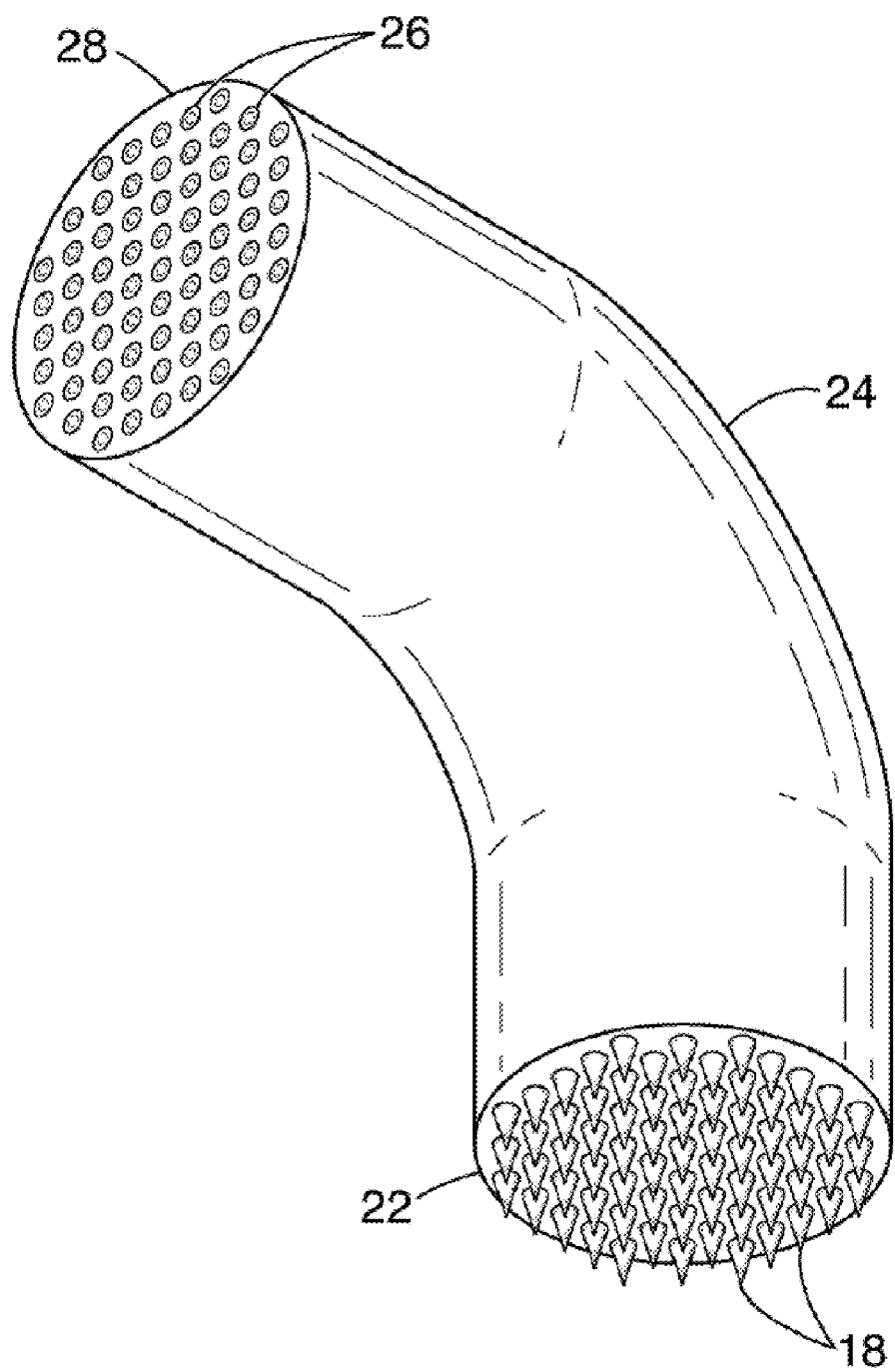
FIG. 5 is a not-to-scale schematic illustration of an optical component.

In one embodiment, nanotubes with protrusive spikes are used to prepare a structured nanomaterial. Referring to FIG. 5, protrusive phase 18 is a solid material, also referred to as detector material. Each of the protrusive phases 18 is used as an optical waveguide, also referred to as an optical conduit, a pixel, or a fiber for the purposes of the present disclosure. The optical conduits are generally, but not necessarily, cylindrical in shape between the proximal and distal ends of the optical component. Light of a selected wavelength or range of wavelengths (e.g. infrared, visible, and/or ultraviolet light) may be transmitted through an optical conduit of the protrusive phase dielectric material 18. The differentially etched, composite, ordered material having sharp surface features can thus be used as an array of optical waveguides having sharp pointed tips.

In one embodiment, for practical optical components, an optical conduit is realized by having the refractive index (nf) of the core material comprising the protrusive phase that exceeds the nf of the recessive phase, which functions as the cladding, by at least about 0.1 percent at a selected wavelength or wavelength range. The greater the difference of nf, the more the light intensity is concentrated to the core region. Too small an index difference leads to the spatial energy spread significantly protruding into the cladding phase. For example, a core phase having an nf of about 1.46 can have a cladding with an nf of about 1.45, and generally act as a good waveguide. An array can have a common recessive material but different protrusive materials for individual optical conduits such that individual optical conduits can have different optical properties.

Referring to FIG. 5 again, an optical component 24 has a distal end 22 that comprises an array of optical waveguides having sharp surface feature tips or spikes 18. Such an array can have from as few as two to more than one billion per square centimeter of individual, parallel, optical waveguides having sharp points that can be used as massively parallel sensors, parallel scanning optical microscopy probes, and the like. The optical waveguides comprising the optical component 24 can be optical conduits of any desired length and diameter, a plate or wafer of any desired thickness and diameter, or any other desired size and shape. The optical waveguides comprising the optical component 24 can be flexible or rigid, elastic or inelastic. The individual strands of protrusive phase that form the discrete tips or spikes 18 and their associated optical conduits run substantially parallel to one another and completely (continuously) through the optical component 22 and are thus individually addressable as discrete areas 26 at a proximal end 28. In a typical arrangement, the optical waveguides are optical conduits comprising the protrusive phase having circular cross-sections surrounded by the ambient (e.g. air which provides the required surrounding other dielectric material with a lower refractive index) adjacent to the tips or spikes 18. The protrusive phase is generally surrounded by the recessive phase in regions other than those adjacent to the tips or spikes 18. To achieve individual addressability from discrete areas 26 at a proximal end 28, in a typical embodiment the recessive phase is a dielectric material having a lower refractive index compared to the protrusive phase material.

It can be understood from the description hereinabove that at least the protrusive phase must be sufficiently optically transparent at the selected wavelength(s) to be characterized as an optical waveguide. The optical waveguide can be a material wherein the attenuation length of light of the selected wavelength(s) is at least as long as the average length of the sharp surface features of the protrusive phase. It is preferable that the attenuation length of light of selected wavelength(s) be at least ten times as long as the average length of the sharp surface features of the protrusive phase.

The selected wavelengths of light are guided (confined) through the protrusive phase. In one embodiment, the mechanism for guiding light through the optical conduit is for the protrusive phase to be characterized by a higher index of refraction than the recessive phase for at least one selected wavelength, a selected range of wavelengths, or a group of selected wavelengths of light. The protrusive phase thus acts as a waveguide for the selected wavelength(s) of light. In another embodiment, the recessive phase can be reflective or a reflective interface material can be present between the recessive and protrusive materials, such that light at the selected wavelengths is reflected, thus confining the selected wavelengths of light to the protrusive phase. For example, the recessive phase or the interface material can be a metal or metal alloy.

The reflection that occurs at the interface of the recessive and protrusive phase materials can be enhanced by the formation of a metallic "mirror" film at the interface. Various methods can be employed to generate this film. One method comprises drawing recessive glass tubes into which soft metal, such as gold, or a metal composite, such as gold or gold-silver composite, coated protrusive glass rods have been placed. The soft (low melting point) metal will tend to melt as the glasses soften. As the glasses get drawn, the molten metal conforms to the interface between the narrowing tube and rod. The recessive glass tubes also coalesce into the support structure. As the glasses cool and harden so will the metal forming the mirror surface around the narrowed protrusive rod. Combined with bundling, fusing, wafer cutting, and etching, as described above, metal mirrored arrays can thus be formed.

Another method of forming a metal mirrored protruding phase involves using a high temperature melting metal (such as platinum and tungsten) coated glass rod to form the arrays. These metal coated glass rods can be inserted through the core of recessive glass tubes. The recessive glass tubes can then be drawn such that the respective tube coalesces around the metal coated rod without the metal melting or softening as the tube is drawn. Subsequent cutting, bundling, and fusing, as described above, can be used to create a metal mirrored array.

The metal can then be etched along with the recessive and protrusive glasses. Depending on the relative rates of etching, various recessed or protruding metal features can result. By proper choice of the etchant or mixture of etchants a desired structure can be formed at the distal end of the optical component. By use of a metal or other reflective material at the interface of the protrusive phase optical conduit and the recessive phase support structure, the protrusive phase can have a refractive index that is greater than, equal to, or less than the recessive phase yet perform the required waveguide function.

For some applications, it may be desirable to produce the optical conduits in the form of a long column with the protrusive surface features at the distal end of the column to transmit the selected wavelengths of light over a distance through the protrusive phase. Moreover, it may be desirable to produce tapered conduits with the sharp surface features protruding from the tapered distal end of the conduit while a larger cross section proximal end of the conduit is more easily and individually addressed. Such tapering conduits are particularly easy to produce if the material is produced by drawing and bundling glass fibers as described above.

The optical waveguides can be used in at least two basic modes. In one mode of operation, light guided through the protrusive phase from the proximal end propagates to the sharp, protrusive features at the distal end, interacts with an analytical sample, and returns back through the protrusive phase to the proximal end as an optical data signal to a receiver or array of receivers contacted at the proximal end. In another mode of operation, light directed onto an analytical sample via another means interacts with the sample, is picked up by the sharp protrusive features at the distal end, and is guided through the protrusive phase to a receiver or array of receivers connected to the proximal end.

The optical waveguides can be utilized in various optical instruments that operate in one or both of the above described modes. Potential applications include analytical processes where small regions of space need to be optically probed, particularly in cases where it is desirable to probe many regions over an area simultaneously.

Figure 6:
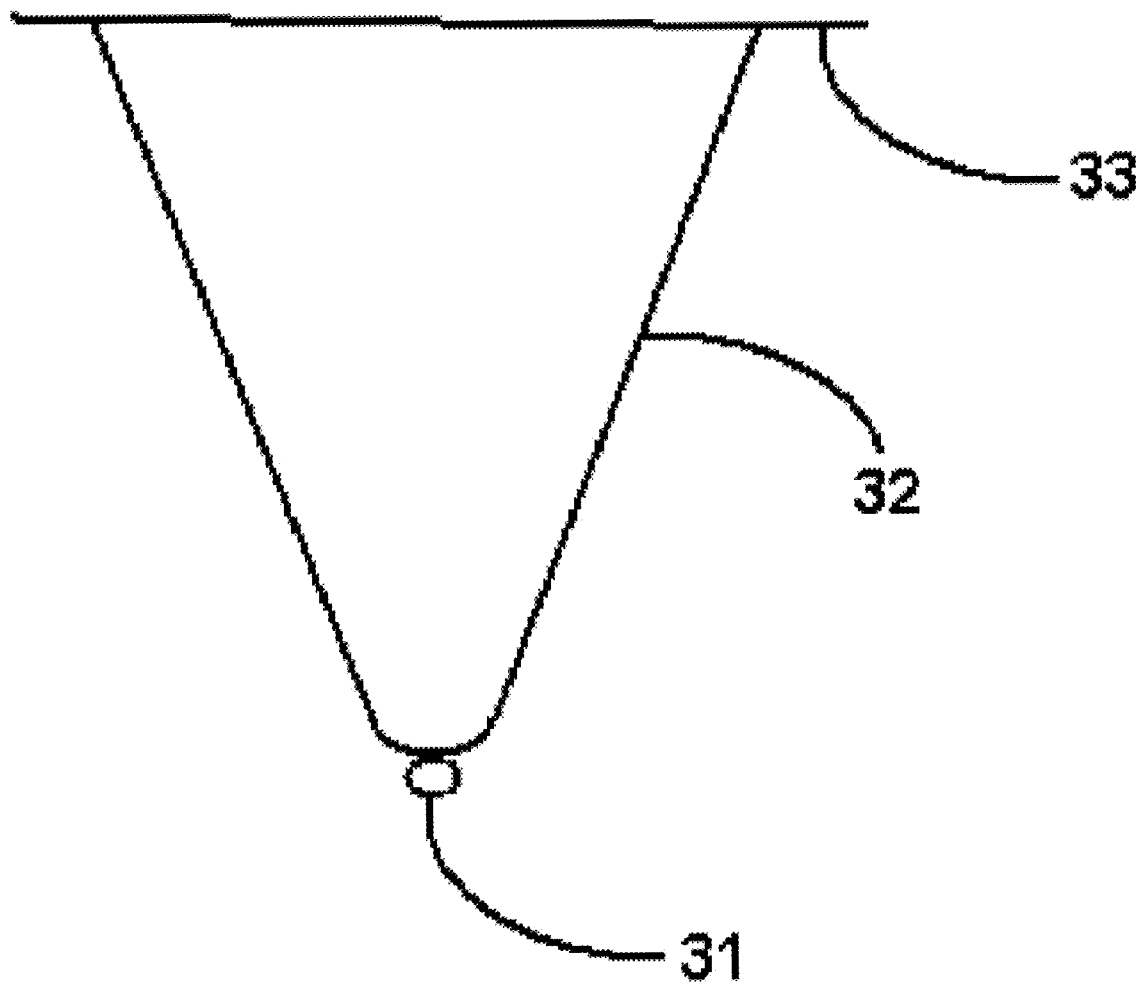
FIG. 6 is a not-to-scale schematic illustration of a metal nanoparticle attached to a single protrusive phase.

In one embodiment, the probe tips are functionalized to change their optical response as a result of biological or environmental contaminants or other chemical constituents. For example, the optical waveguides can be used as Surface Enhanced Raman Spectroscopy (SERS) probes. Referring to FIG. 6, a metal nanoparticle 31, such as a gold nanoparticle adhering to a single protruding feature 32 extending from the support structure 33 at a distal end of an optical component, can be employed for a SERS probe. Specifically, the distal (protrusive) end of the probes can be modified with SERS active structured nanoparticles, so that the multiple nanoparticle containing probe tips can be used for SERS as a multi-tipped sensor or probe, with the option of spatially resolving the signal. Using the evanescent optical fields of each protrusive feature, an array of protrusive features can be used instead of a single tip in a probe, thus gathering many data points in parallel and accelerating the image acquisition process. The protruding tips can be coated with a thin adhesive layer, for example a monolayer of ethyleneimine deposited from solution, and brought in contact with a surface decorated with nanoparticles of gold or some other metal, which adheres metal nanoparticles to the protrusive features.

As a fiber with sharp features on the end, the optical waveguides may be used as biological probes. In particular, an intracellular probe connected to an optical microscope or spectroscope can be formed from the fiber with sharp features on an end.

In most configurations, instruments that use the optical component may also include other components used in optical instruments, as described in U.S. Patent Publication No. 2008/0080816, the entirety of which is hereby incorporated by reference.

While the present disclosure has been described with reference to certain embodiments, other features may be included without departing from the spirit and scope of the present invention. It is therefore intended that the foregoing detailed description be regarded as illustrative rather than limiting, and that it be understood that it is the following claims, including all equivalents, that are intended to define the spirit and scope of this invention.

The invention claimed is:

1. A large area curved shape structure, comprising:
    a plurality of bundled tubes having a first end and a second end along the longitudinal direction of the bundled tubes,
    wherein a detector material is disposed inside of the bundled tubes, the detector material being substantially continuous between the first end and the second end,
    wherein the first end is a curved surface with a radius of curvature, relative to the longitudinal direction of the plurality of bundled tubes, of no more than about 1 cm.

2. The large area curved shape structure of claim 1, wherein the radius of curvature is no more than about 1 mm.

3. The large area curved shape structure of claim 1, wherein the detector material is selected from the group consisting of Si, InSb, HgCdTe, InGaAs, vanadium oxide, lead salt, and combinations thereof.

4. The large area curved shape structure of claim 1, wherein the respective tube has a nanometer size diameter.

5. The large area curved shape structure of claim 4, wherein the respective tube has a diameter of about 300 nm.

6. The large area curved shape structure of claim 1, wherein the tubes comprise drawn tubes.

7. A large area curved shape structure, comprising:
    a plurality of bundled tubes having a first end and a second end along the longitudinal direction of the bundled tubes,
    wherein a detector material is disposed inside of the bundled tubes, the detector material being substantially continuous between the first end and the second end, wherein the first end is a curved surface with a radius of curvature, relative to the longitudinal direction of the plurality of bundled tubes, of no more than about 1 cm, and wherein the melting point of the detector material is close to the softening temperature of the bundled tubes.

8. A large area curved shape structure, comprising:

a plurality of bundled tubes having a first end and a second end along the longitudinal direction of the bundled tubes, wherein a detector material is disposed inside of the bundled tubes, the detector material being substantially continuous between the first end and the second end, wherein the first end is a curved surface with a field view, relative to the longitudinal direction of the plurality of bundled tubes, of about 90 degree.

9. The large area curved shape structure of claim 8, wherein the tubes comprise drawn tubes.

\* \* \* \* \*